United States Patent
Washburn

(10) Patent No.: US 9,547,670 B2
(45) Date of Patent: **\*Jan. 17, 2017**

(54) SYSTEM AND METHOD FOR A SELF SERVICE PORTAL AND AUTOMATION FOR INTERNALLY HOSTED VIRTUAL SERVER RESOURCES

(71) Applicant: STATE FARM MUTUAL AUTOMOBILE INSURANCE COMPANY, Bloomington, IL (US)

(72) Inventor: Caleb Washburn, Normal, IL (US)

(73) Assignee: STATE FARM MUTUAL AUTOMOBILE INSURANCE COMPANY, Bloomington, IL (US)

(\*) Notice: Subject to any disclaimer, the term of this patent is extended or adjusted under 35 U.S.C. 154(b) by 47 days.

This patent is subject to a terminal disclaimer.

(21) Appl. No.: 14/308,249

(22) Filed: Jun. 18, 2014

(65) Prior Publication Data
US 2014/0304222 A1 Oct. 9, 2014

(51) Int. Cl.
| G06F 15/177 | (2006.01) |
| G06F 17/30 | (2006.01) |
| H04L 12/24 | (2006.01) |
| H04L 29/08 | (2006.01) |
| G06F 9/445 | (2006.01) |

(52) U.S. Cl.
CPC ........ G06F 17/30289 (2013.01); G06F 8/61 (2013.01); G06F 15/177 (2013.01); H04L 41/0806 (2013.01); H04L 67/02 (2013.01); H04L 67/1097 (2013.01); H04L 67/34 (2013.01)

(58) Field of Classification Search
CPC ...... H04L 67/02; H04L 67/1097; H04L 67/34; G06F 15/177; G06F 17/30289
USPC ....... 709/201, 202, 203, 225, 226, 213, 227, 709/228
See application file for complete search history.

(56) References Cited

U.S. PATENT DOCUMENTS

| 6,311,194 | B1 | 10/2001 | Sheth et al. |
| 7,076,728 | B2 | 7/2006 | Davis et al. |
| 8,161,085 | B2* | 4/2012 | Souder ............... G06F 17/3038 707/825 |
| 2002/0049738 | A1 | 4/2002 | Epstein |
| 2004/0148398 | A1* | 7/2004 | Park ................. H04L 29/12264 709/227 |

(Continued)

OTHER PUBLICATIONS

Action for U.S. Appl. No. 13/826,753 dated Jan. 16, 2014.
Office Action for U.S. Appl. No. 13/826,753 dated Jun. 25, 2013.

*Primary Examiner* — Dhairya A Patel
(74) *Attorney, Agent, or Firm* — Marshall, Gerstein & Borun LLP; Randall G. Rueth

(57) ABSTRACT

A method and apparatus may provision a new computer code file as an update or a new application for end nodes of a cloud computing system. The method and apparatus may receive a computer code file at a repository server via a portal interface to an automation service. The computer code file may include a discrete file or package of files corresponding to a complete application or an update for an application for execution on cloud computing system nodes. The method and apparatus may also receive provisioning conditions at the automation service via the portal interface, send the computer code file to the cloud computing system end nodes based on the received provisioning conditions, and cause the sent computer code file to be installed on each of the plurality of cloud computing system end nodes.

16 Claims, 9 Drawing Sheets

(56) References Cited

U.S. PATENT DOCUMENTS

| | | | |
|---|---|---|---|
| 2005/0060535 A1* | 3/2005 | Bartas | H04L 63/145 |
| | | | 713/154 |
| 2005/0251573 A1* | 11/2005 | Merkow | G06F 21/602 |
| | | | 709/226 |
| 2007/0179995 A1* | 8/2007 | Prahlad | G06F 17/30528 |
| 2008/0082539 A1 | 4/2008 | Doane et al. | |
| 2011/0047405 A1* | 2/2011 | Marowsky-Bree | G06F 11/1415 |
| | | | 714/15 |
| 2011/0112973 A1 | 5/2011 | Sanghvi | |
| 2011/0145153 A1 | 6/2011 | Dawson et al. | |
| 2012/0078948 A1* | 3/2012 | Darcy | G06F 17/30197 |
| | | | 707/769 |
| 2012/0185913 A1 | 7/2012 | Martinez et al. | |
| 2013/0173631 A1 | 7/2013 | Roe et al. | |
| 2013/0262923 A1 | 10/2013 | Benson et al. | |

* cited by examiner

FIG. 5

SYSTEM AND METHOD FOR A SELF SERVICE PORTAL AND AUTOMATION FOR INTERNALLY HOSTED VIRTUAL SERVER RESOURCES

CROSS-REFERENCE TO RELATED APPLICATION

This application is a continuation of U.S. application Ser. No. 13/826,753, filed Mar. 14, 2013, the disclosure of which is hereby incorporated herein by reference in its entirety for all purposes.

TECHNICAL FIELD

The present disclosure generally relates to a system and method for a self service portal and automation for internally hosted virtual server resources and for provisioning cloud resources among various cloud computing system assets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Provisioning is a process to prepare nodes of a computer network for new services to network users. Typically, the provisioning process closely monitors the rights of a user attempting to change the network to ensure other users' privacy and network resource security. Provisioning also ensures compliance with network protocols and minimizes the vulnerability of systems to penetration and abuse while reducing a user's ability to customize any configurations.

Cloud-based systems are generally described as providing on-demand self-service to its users. The self-service nature of cloud computing typically lets users edit and obtain cloud services (e.g., configurations, applications, the infrastructure supporting the applications, etc.) without action from a system administrator. A cloud service portal provides this access to system users. Provisioning in cloud-based systems most often occurs when a company transitions its existing applications or new applications to the cloud. However, cloud-based systems often require new applications to be significantly re-engineered before they may be provisioned.

SUMMARY

In one embodiment, a computer-implemented method for provisioning computer code in a cloud computing system may receive a computer code file at a repository server via a portal interface to an automation service. The computer code file may include a discrete file or package of files corresponding to a complete application or an update for the application for execution on a plurality of cloud computing system nodes. The method may also receive one or more provisioning conditions at the automation service via the portal interface, and send the computer code file to a plurality of cloud computing system end nodes based on the received provisioning conditions. Further, the method may cause the sent computer code file to be installed on each of the plurality of cloud computing system end nodes.

In a further embodiment, a computer device may provision computer code in a cloud computing system. The computer device may comprise one or more processors and one or more memories coupled to the one or more processors. The one or more memories may include computer executable instructions stored therein that, when executed by the one or more processors, cause the one or more processors to receive a computer code file at a repository server via a portal interface to an automation service. The computer code file may include a discrete file or package of files corresponding to a complete application or an update for the application for execution on a plurality of cloud computing system nodes. The instructions, when executed, may also receive one or more provisioning conditions at the automation service via the portal interface, and send the computer code file to a plurality of cloud computing system end nodes based on the received provisioning conditions. Further, the instructions, when executed, may cause the sent computer code file to be installed on each of the plurality of cloud computing system end nodes.

In a still further embodiment, a tangible computer-readable medium may include non-transitory computer readable instructions stored thereon for provisioning computer code in a cloud computing system. The instructions may comprise receiving a computer code file at a repository server via a portal interface to an automation service. The computer code file may include a discrete file or package of files corresponding to a complete application or an update for the application for execution on a plurality of cloud computing system nodes. The instructions may also comprise receiving one or more provisioning conditions via the portal at the automation service and sending the computer code file to a plurality of cloud computing system end nodes based on the received provisioning conditions. Further, the instruction may comprise causing the sent computer code file to be installed on each of the plurality of cloud computing system end nodes.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 illustrates one embodiment of still another portion of a user interface for a self-service portal for the computer-implemented system for provisioning applications in a cloud computing environment;

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
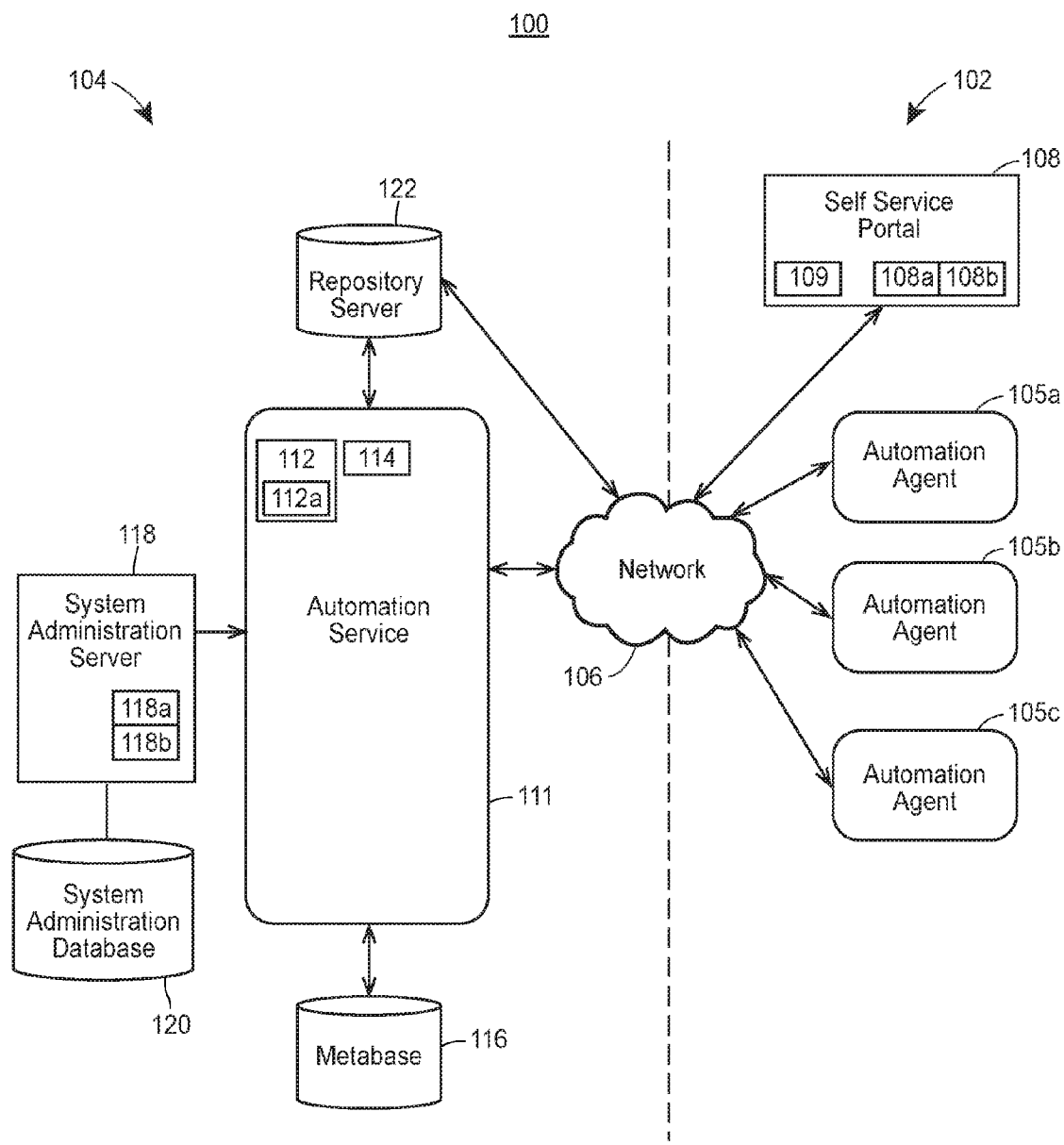
FIG. 1 illustrates a block diagram of one portion of a computer-implemented system for provisioning applications in a cloud computing environment.
Figure 2:
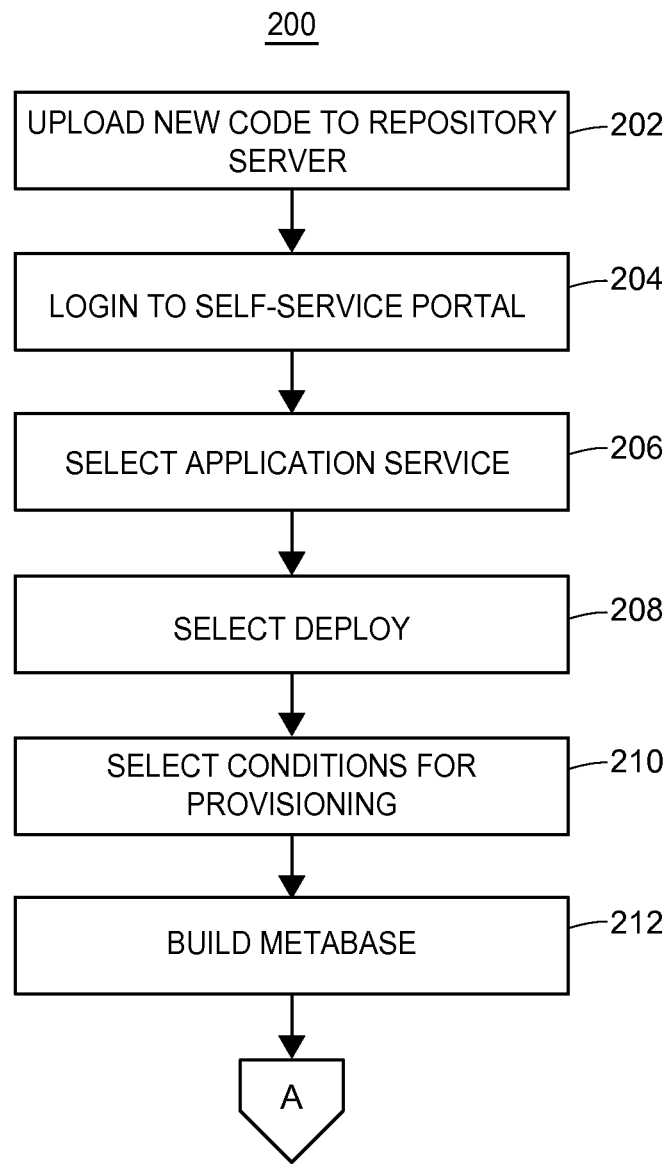
FIG. 2 illustrates one embodiment of a flowchart for a method for preparing code for provisioning in a cloud computing system.

With reference to FIG. 1, a system 100 for provisioning applications and other code in a cloud computing environment may include front end components 102 and backend components 104 in communication with each other via a communication link 106 (e.g., computer network, telephone system, in-person communication, etc.). FIG. 1 illustrates a block diagram of a high-level architecture of a provisioning system 100 including various software and hardware components or modules that may employ a method to provision applications and other code to users or nodes 105a, 105b, and 105c in a cloud computing environment. The various modules may be implemented as computer-readable storage memories containing computer-readable instructions (i.e., software) for execution by a processor of the computer system 100. The modules may perform the various tasks associated with deploying, provisioning, and verifying installation of new code to nodes 105a-c within a cloud computing system. The computer system 100 also includes both hardware and software applications, as well as various data communications channels for communicating data between the various hardware and software components.

The provisioning system 100 may include various entities at the front end 102 that may communicate code and other data to the backend components 104 to complete deployment and provisioning of new code in a cloud computing system. For example, the front end components 102 may include a self service portal 108 and various end nodes 105. The portal 108 may include an interface for communicating new code and applications to the backend components 104 of the provisioning system 100. In some embodiments, the portal may be implemented as a web-based application executing with web browser application on a computing device of an application developer. In other embodiments, the portal may be implemented as a web-browser plug-in. Implemented as a web-based application, the portal 108 may use the memory and processing services of a developer's computing device. For example, the computing device including a browser and portal application 108 may include a memory 108a storing various instructions or functions described herein and a processor 108b and new code 109 or an application for provisioning. For example, the portal 108 may execute instructions to communicate with an automation service 111 and cause the service 111 to access a memory 112 using a processor 114 to send instructions to the portal to display a graphical interface (GUI) 112a for the provisioning system 100. The GUI 112a may be displayed within a web browser executing on the portal 108. In some embodiments the portal 108 includes a computing device that executes instructions stored in the memory 108a using the processor 108b to upload new code 109 to a code repository server, select provisioning conditions through the GUI 112a, cause the backend components to build a metabase 116 for the code, and execute a provisioning process for the new code 109. The new code 109 may include a discrete file or package of files for a complete application or an application update. The new code 109 may be written for execution on each of the plurality of cloud computing system nodes 105.

A system administration server 118 may also include a memory 118a storing instructions for execution by a processor 118b to store metadata and other information corresponding to the new code. In some embodiments, the automation service 111 builds the metabase 116 to provide information about the new code 109 for provisioning while the system administration server 118 builds a system administration database 120 to provide information about the new code 109 to automate repetitive network administrative tasks, quickly deploy critical applications, and proactively manage infrastructure changes within the system 100.

With reference to FIGS. 2-6, the system 100 described herein may be employed in a method 200 (FIG. 2) to provision new code and applications within a cloud computing system. The method 200 may include one or more functions or routines in the form of non-transitory computer-executable instructions that are stored in a tangible computer-readable storage medium and executed using a processor of a computing device (e.g., the portal 108, the automation service 111, or any combination of computing devices within the system 100). The routines may be included as part of any of the modules or instructions described in relation to FIG. 1, above, or FIG. 6, below, or as part of a module that is external to the system illustrated by FIGS. 1 and 6.

At function 202, the method may upload new code to a repository server 122. For example, a user may cause the processor 108b of the portal 108 to execute instructions stored in the memory 108a to upload the new code to a remote repository server 122 via the network 106. In some embodiments, a Maven plug-in causes instructions to be executed to upload the new code 109 to the repository server 122.

Figure 3:
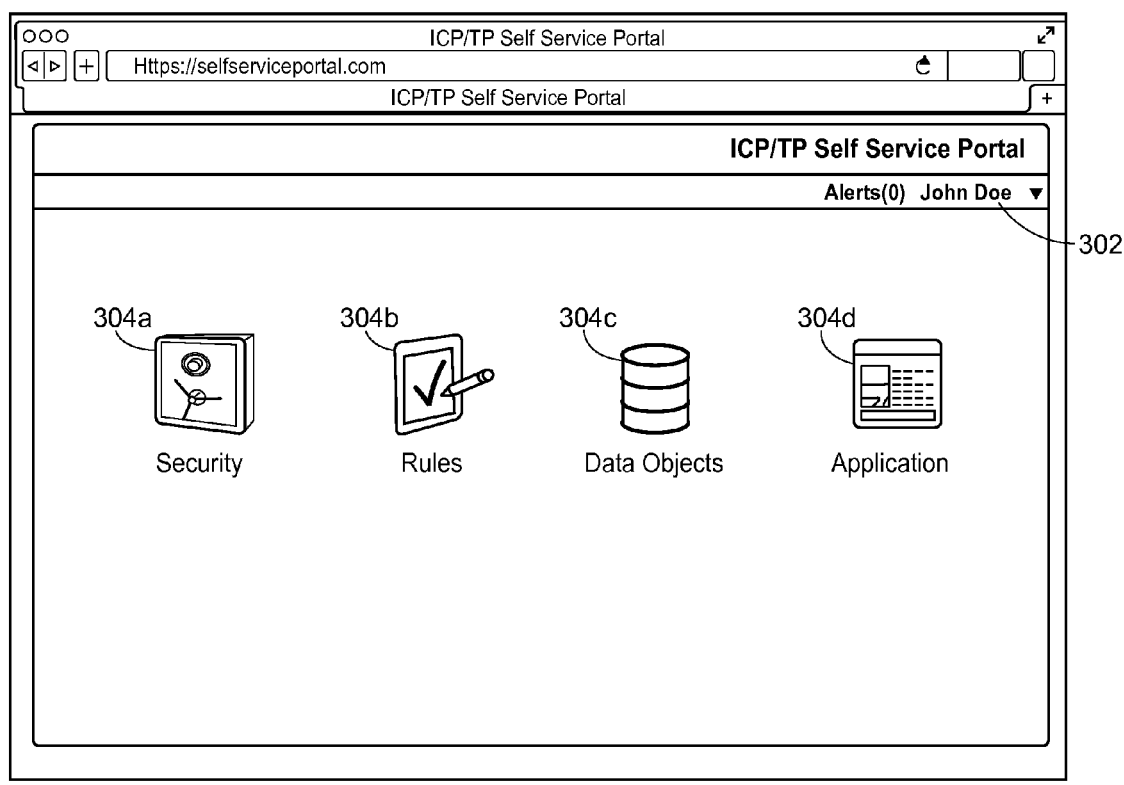
FIG. 3 illustrates one embodiment of a portion of a user interface for a self-service portal for the computer-implemented system for provisioning applications in cloud computing environment.

At function 204, the method 200 may access the automation service 111 via the network 106. In some embodiments, the function 204 may cause the portal 108 to login to a user interface 112a for the service 111. FIG. 3 illustrates an example interface 300 of the portal 108 for the system 100. The interface 300 may include the GUI 112a described herein and may generally be described as an "Integrated Customer Platform / Technical Platform" to provision new code and applications to end nodes in a cloud computing system. In some embodiments, the interface 300 may include a first web page for a browser application to facilitate the provisioning process as described herein. A user or automated service may access the interface 300 using login credentials 302. The interface 300 may present several services 304 to the user. In some embodiments, the services include providing access to security settings 304a, rules for provisioning new code and applications in a cloud computing system 304b, access to data objects 304c, and processes for provisioning new code and applications in the cloud computing system 304d.

At function 206, the method 200 may select the application service 304d to begin a provisioning process. In some embodiments, a user or an automated process may initiate the application service 304d using the interface 300. For example, using a mouse or other pointing device, a user may select an icon for the application service 304a displayed within the interface 300 to begin the provisioning process.

Selecting an icon may cause the system 100 (or system 600 of FIG. 6, described below) to execute one or more instructions to complete the provisioning process as herein described.

Figure 4:
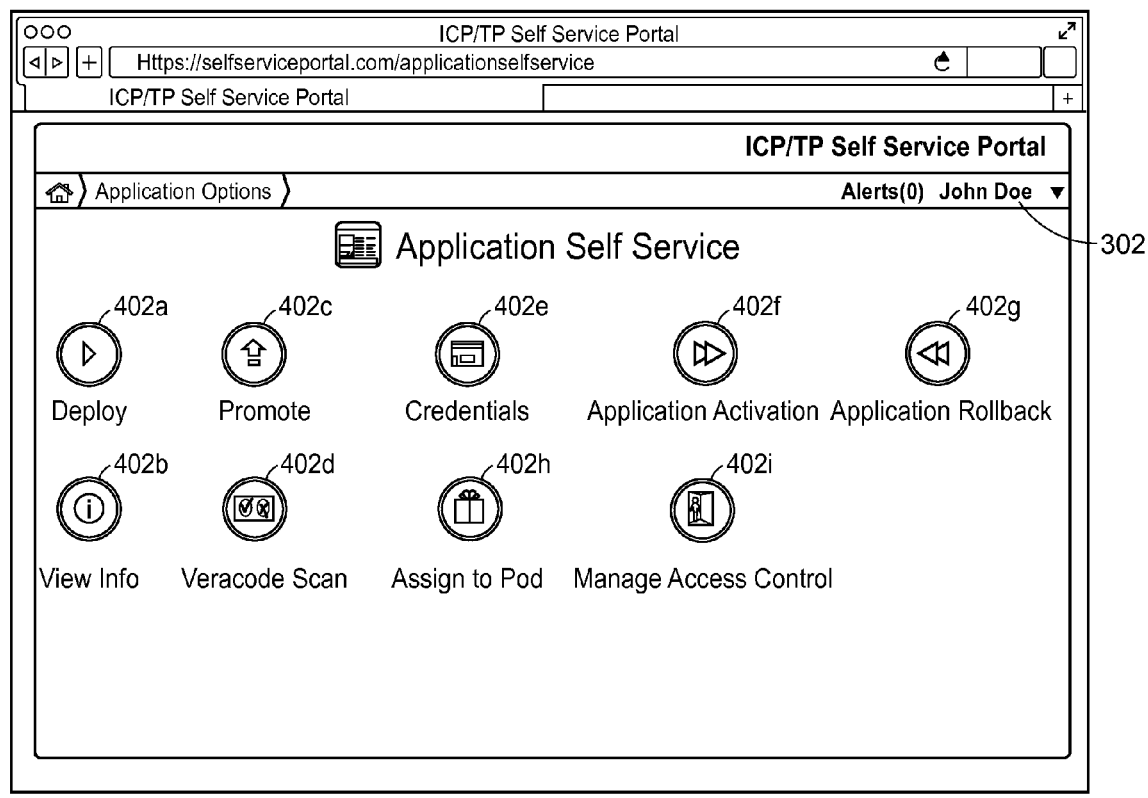
FIG. 4 illustrates one embodiment of another portion of a user interface for a self-service portal for the computer-implemented system for provisioning applications in a cloud computing environment.

Upon selection of the application service 304d, the method 200 may display another interface to facilitate the provisioning process. FIG. 4 illustrates an example interface 400 of the portal 108 for the system 100. In some embodiments, the interface 400 may include a second web page for a browser application to facilitate the provisioning process as described herein. The interface 400 may also include the GUI 112a as described herein and may also be generally described as an "Integrated Customer Platform/Technical Platform" to provision new code and applications in a cloud computing system. The interface 400 may include several icons 402 that, upon selection by a user or automated process, cause the system 100 to execute various other instructions that are related to the provisioning process described herein. For example, the icons and functions may include a deploy function 402a, a view info function 402b, a promote function 402c, a veracode function 402d, a credentials function 402e, an application activation function 402f, an application rollback function 402g, an assign to a pod function 402h, and a manage access control 402i.

Figure 5:
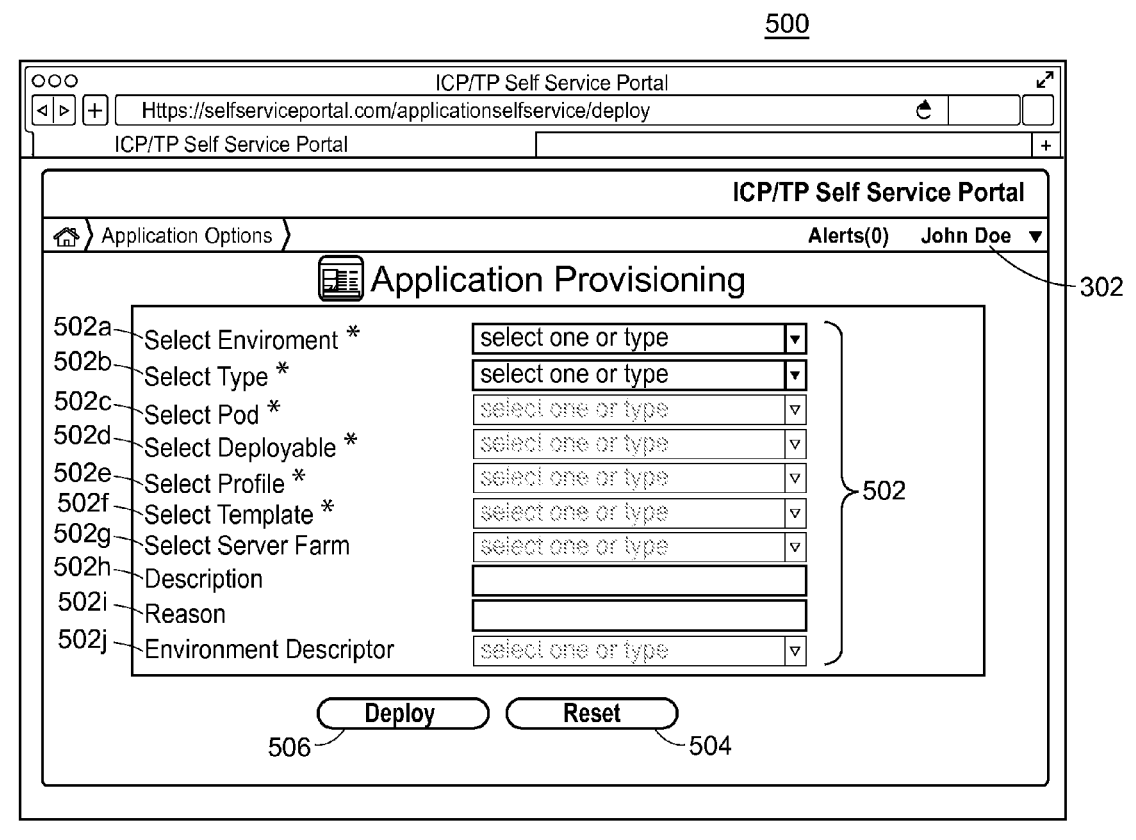

At function 208, the method 200 may select a deploy function 402a. Selection of the deploy function 402a may cause the method 200 to display another interface to facilitate the provisioning process, generally, and to provide various conditions for a user or automated process to select for the provisioning process. FIG. 5 illustrates an example interface 500 of the portal 108 for the system 100. The interface 500 may include several conditions 502 to shape the provisioning process. In some embodiments, the interface 500 may include a third web page for a browser application to facilitate the provisioning process as described herein. The configurable conditions 502 may include an environment 502a, a type 502b, a pod 502c, a deployable indicator 502d, a profile 502e, a template 502f, a server farm 502g, a description 502h, a reason 50i, and an environment descriptor 502j. The environment descriptor 502j may indicate whether the new code 109 is to be provisioned to a test environment or deployed to nodes 105 for live use in a deploy environment. The pod 502c may indicate how many and what type of machines the nodes 105 are for the provisioning process.

At function 210, the method 200 may select one or more of the conditions 502 for the provisioning process. The interface 500 may also include one or more selectable objects 504, 506 that, upon selection by a user or automated process, cause the system to execute further instructions to deploy the new code 109. For example, selection of a reset object 504 may cause the system 100 to execute instructions to clear any selected conditions 502, while a deploy object 504 may cause the system 100 to begin a deployment and provisioning process.

At function 212, the method 200 may use the code 109 and any conditions 502 selected by function 210 to build a metabase 116 for the provisioning process. In some embodiments, the method 200 may use characteristics of the new code 109 (e.g., version number, build date, length, and data, flow, output, and control dependencies, etc.), the conditions 502 selected at function 210 to create the metabase 116 (i.e., a database storing metadata), as well as information about the system 100 to determine how the new code 109 will be provisioned within a cloud computing system. The metabase 116 may be a physical database or may be a virtual database in which the metadata necessary to provision the new code 109 is gathered from various sources on the fly when it is needed.

Figure 6:
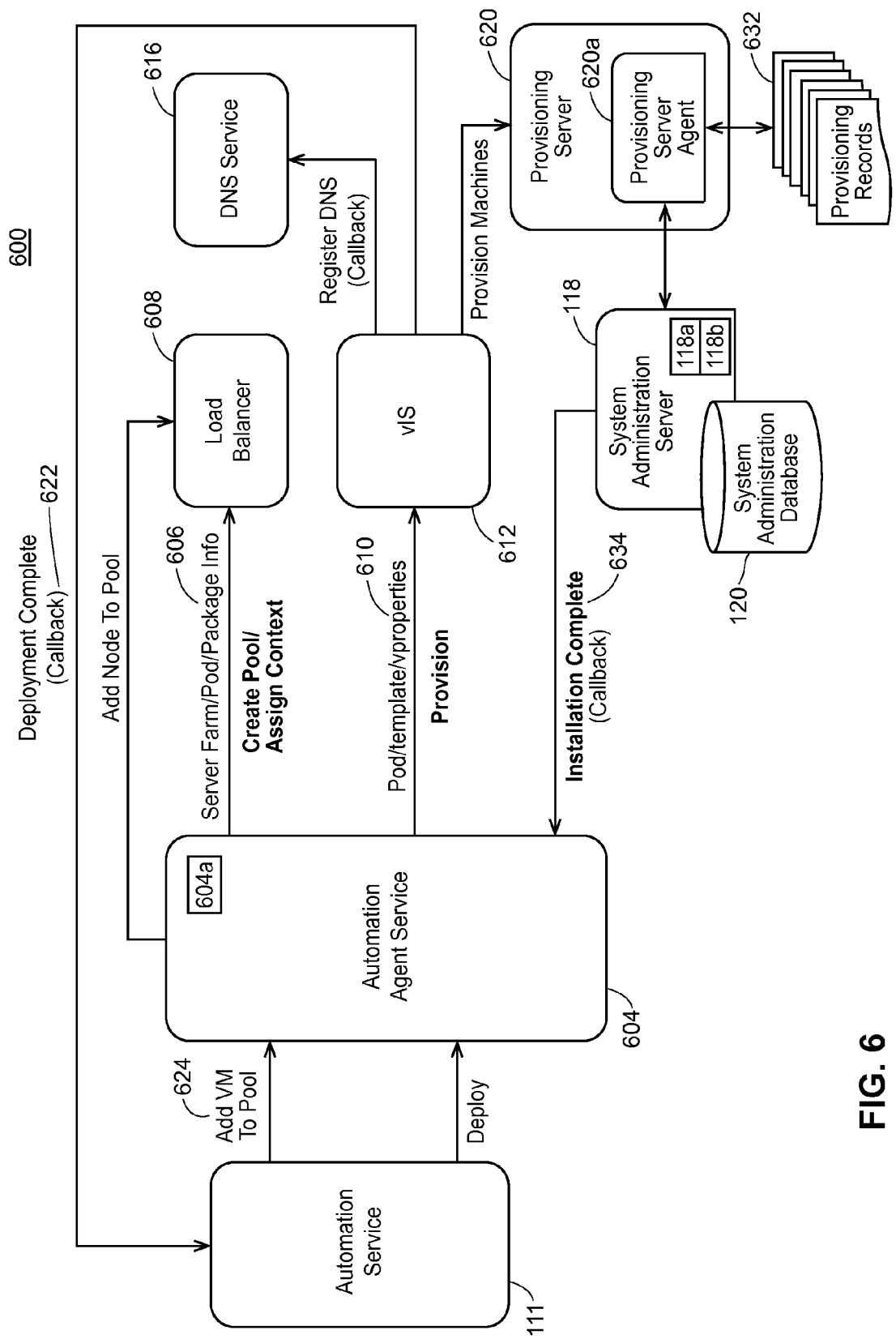
FIG. 6 illustrates a block diagram of another portion of a computer-implemented system for provisioning applications in a cloud computing environment.
Figure 7:
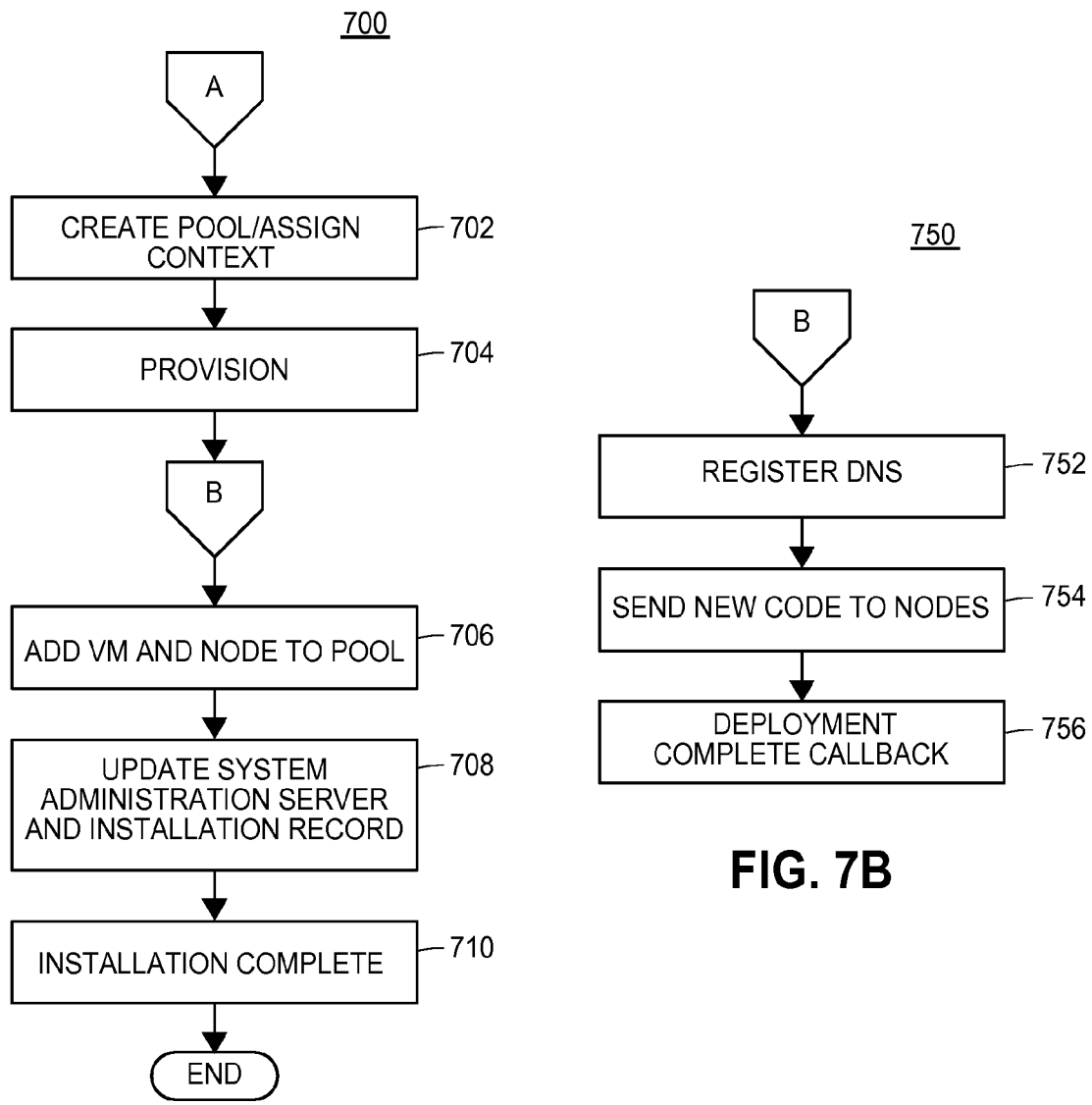
FIGS. 7A and 7B illustrate embodiments of flowcharts for methods for provisioning code in the cloud computing system.
Figure 8:
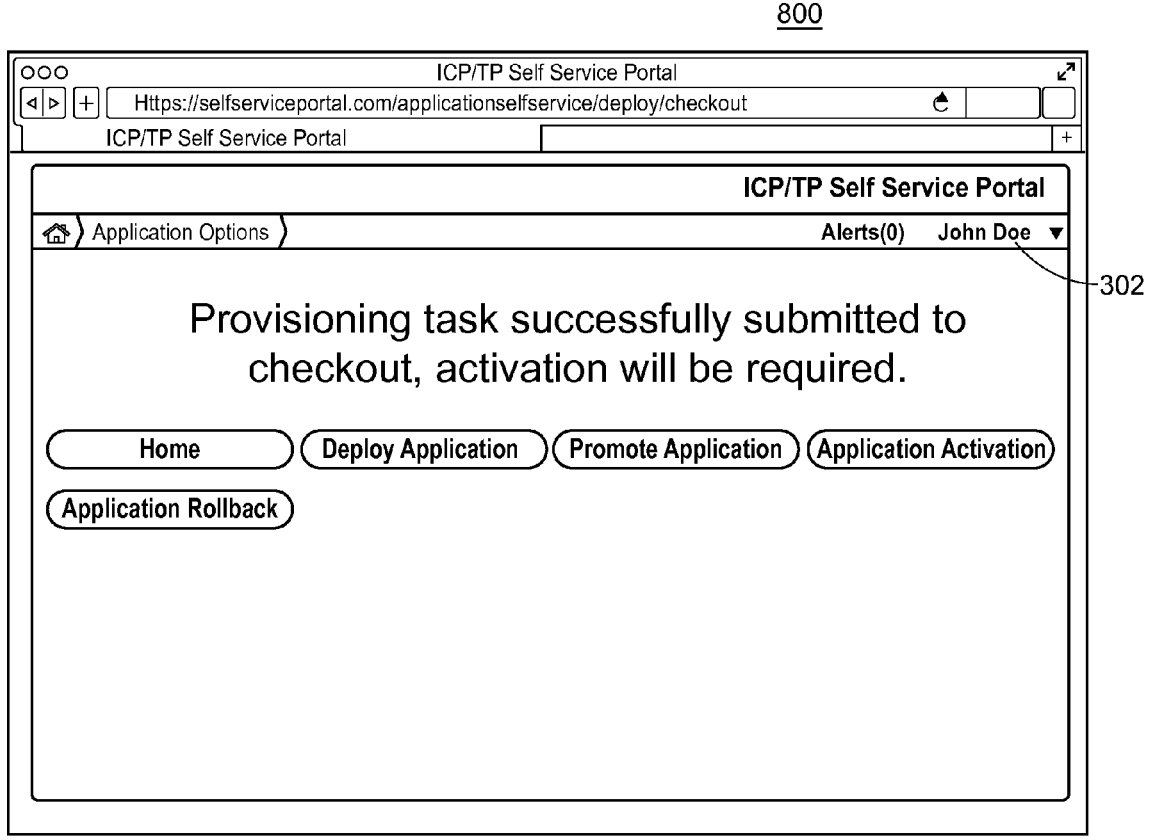
FIG. 8 illustrates one embodiment of still another portion of a user interface for a self-service portal for the computer-implemented system for provisioning applications in a cloud computing environment.

With reference to FIGS. 6-8, a system 600, method 700, and interface 800 of the portal 108 for the system 100, 600 may complete the deployment and provisioning process described herein. In some embodiments, the interface 800 may include a fourth web page for a browser application to facilitate the provisioning process as described herein. FIG. 6 illustrates a block diagram of a high-level architecture of a provisioning system 600 including various software and hardware components or modules that may employ a method to provision applications and other code to users or end nodes in a cloud computing environment. The various modules (e.g., 111, 604, 608, 612, 616, 620, 624, and 628) may be implemented as a computing device (FIG. 9) including processors and tangible computer-readable storage memories containing computer-readable instructions (i.e., software) for execution by various processors. The modules may perform the various tasks associated with deploying, provisioning, and verifying installation of new code to nodes within a cloud computing system. The computer system 600 also includes both hardware and software applications, as well as various data communications channels for communicating data between the various hardware and software components.

The system 600 modules may communicate code and other data to each other to complete deployment and provisioning of new code in a cloud computing system. From the system 100 and method 200, the portal 108 may include instructions for execution on a processor to initiate deployment and provisioning of new code 109 with the automation service 111. The automation service 111 may include instructions for execution on a processor in response to the instructions received from the portal 108. In some embodiments, the automation service 111 may include instructions to initiate a deployment procedure call 602 to an automation service agent 604. The automation service agent may also be configured to execute instructions to send data to various other modules of the system 600. For example, the automation agent service 604 may be further configured to send data and commands to a load balancer 608, a virtual integrated system server 612, and a system administration server 118, among other modules of the system 600. In some embodiments, the virtual integrated system server 612 is a server including virtual integrated system software such as the Dell® VIS Creator® produced by Dell Inc. of Round Rock, TX. The virtual integrated system server 612 may include instructions to send data and commands to a DNS service 616, the automation service 111, and a provisioning server 620. In some embodiments, the provisioning server 620 is a virtual server including a system administration server agent 620a and configured to communicate the new code 109 to the various nodes 105 of the system 100. The provisioning server 620 and the system administration server agent 620a may also be configured to communicate data and instructions to the system administration server 118 (FIG. 1). The system administration server 118 may be configured to communicate data and instructions to the automation agent service 604.

With reference to FIGS. 6-8, the data and commands of the system 600 and various modules described above may be used in methods 700 and 750 to provision new code to a plurality of nodes in a cloud computing system. As with the method 200 (FIG. 2), the methods 700 and 750 (FIGS. 7a and 7b) may include one or more functions or routines in the form of non-transitory computer-executable instructions that are stored in a tangible computer-readable storage medium and executed using a processor of a computing device (the modules 111, 604, 608, 612, 616, 620, 624, and 628) or any combination of computing devices within the system 600). The routines may be included as part of any of the modules or instructions described in relation to FIG. 1 or FIG. 6, or as part of a module that is external to the system illustrated by FIGS. 1 and 6.

Using the new code 109, the selected conditions 502 and the metabase 116 from the method 200, the method 700 may deploy and provision the new code 109. At function 702, the method may execute instructions to create a load balancer pool and assign a load balancer context to the new code 109 for layer seven load balancing. In some embodiments, the function 702 may send data 606 resulting from execution of the method 200 to a load balancer 608. The function 702 may send one or more of a server farm identification, a pod identification, and other information describing the new code 109 and the selected conditions 502.

At function 704, the method 700 may execute instructions to provision the new code to the nodes of the cloud computing system. With reference to FIG. 7b, a method 750 may complete the provisioning process. At function 752, the method may execute instructions to cause a domain name service (DNS) module 616 to register the new code 109. In some embodiments, the function 752 registers each node 105 identified by the provisioning conditions 502 as including the new code file 109. For example, each node 105 may include a friendly name and an internet protocol (IP) address to be registered with the DNS module 616. Function 752 may also execute instructions to initiate a callback to the virtual integrated system server 612 with data indicating that the new code is registered with the DNS server 616.

At function 754, the method 750 may send the new code 109 to a provisioning server 620 and a system administration server agent 620a may cause the new code 109 to be sent to all nodes 105 identified by the selected conditions 502. At function 756, the method 705 may execute instructions to initiate a call back 622 to the automation service 111 indicating that the deployment of the new code 109 to the nodes 105 is complete.

Returning to method 700, a function 706 may add a virtual machine 624 for the new code 109 to a load balancer pool and cause the automation service agent 604 to call the load balancer module 608 to add each node 105 to the load balancer pool to complete the configuration of the load balancer for each provisioned node. A function 708 may then execute instructions to cause the system administration server agent 620a to update the system administration server 118 and provisioning records 632. The provisioning records may include an XML data repository for the provisioning record. The records 632 may allow any updates or further installations of the new code 109 to occur automatically.

At function 710, the method 700 may execute instructions to send a call back 634 to the automation agent service 604 indicating that installation of the new code at the nodes 105 is complete. Upon receiving the callback 634, the portal 108 may display a interface 800 (FIG. 8) indicating that the new code 109 has been provisioned.

Figure 9:
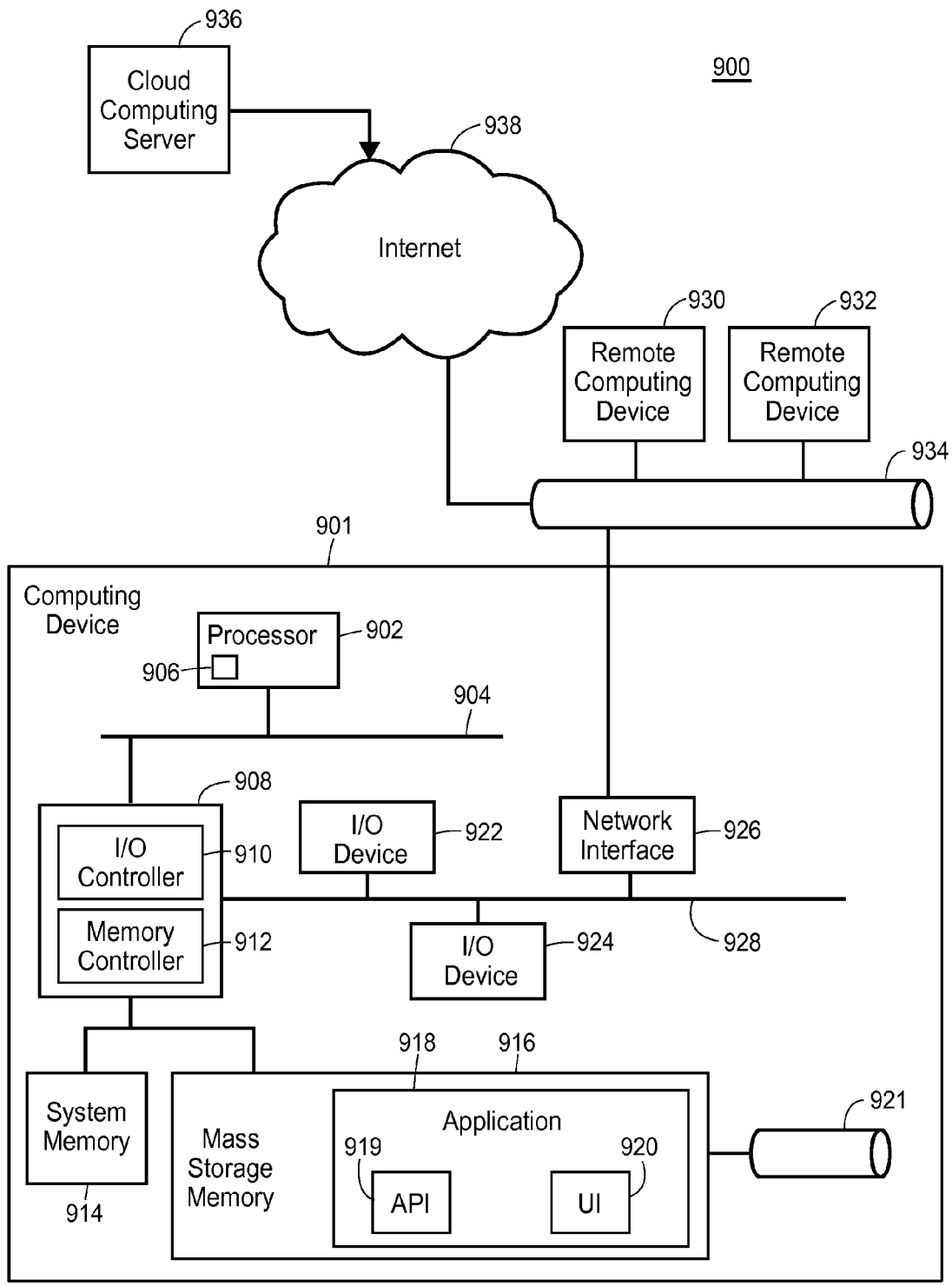
FIG. 9 illustrates a block diagram of a computer to implement the various methods and functions for provisioning code in the cloud computing system.

FIG. 9 is a high-level block diagram of an example computing environment for a system and method for provisioning cloud resources among various cloud computing system assets. The computing device 901 may include a server, a client computing device (e.g., a personal computer, a tablet computer, a Wi-Fi-enabled device, cellular phone, or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example provisioning system 900 may be used to implement and execute the example system of FIGS. 1 and 6, the example methods of FIGS. 2, 7a, and 7b, the user interfaces of FIGS. 3, 4, 5, and 8, and the like. Although the example system 900 is described below as including a plurality of peripherals, interfaces, chips, memories, etc., one or more of those elements may be omitted from other example processor systems used to implement and execute the example system 100, 600 including a portal 108, automation service 111, automation service agnet 604, etc. Also, other components may be added.

As shown in FIG. 9, the computing device 901 includes a processor 902 that is coupled to an interconnection bus 904. The processor 902 includes a register set or register space 906, which is depicted in FIG. 9 as being entirely on-chip, but which could alternatively be located entirely or partially off-chip and directly coupled to the processor 902 via dedicated electrical connections and/or via the interconnection bus 904. The processor 902 may be any suitable processor, processing unit or microprocessor. Although not shown in FIG. 9, the computing device 901 may be a multi-processor device and, thus, may include one or more additional processors that are identical or similar to the processor 902 and that are communicatively coupled to the interconnection bus 904.

The processor 902 of FIG. 9 is coupled to a chipset 908, which includes a memory controller 910 and a peripheral input/output (I/O) controller 912. As is well known, a chipset typically provides I/O and memory management functions as well as a plurality of general purpose and/or special purpose registers, timers, etc. that are accessible or used by one or more processors coupled to the chipset 908. The memory controller 910 performs functions that enable the processor 902 (or processors if there are multiple processors) to access a system memory 914 and a mass storage memory 916.

The system memory 914 may include any desired type of volatile and/or non-volatile memory such as, for example, static random access memory (SRAM), dynamic random access memory (DRAM), flash memory, read-only memory (ROM), etc. The mass storage memory 916 may include any desired type of mass storage device. For example, if the computing device 901 is used to implement a provisioning system 100, 600 having an API 919 (including functions and instructions as described by the methods 200, 700, and 750 of FIGS. 2, 7a, and 7b, respectively), and portal 108 to receive user input (e.g., the new code 109, selected conditions 502), the mass storage memory 916 may include a hard disk drive, an optical drive, a tape storage device, a solid-state memory (e.g., a flash memory, a RAM memory, etc.), a magnetic memory (e.g., a hard drive), or any other memory suitable for mass storage. In one embodiment, non-transitory program functions, modules and routines (e.g., methods 200, 700, and 750, etc.) are stored in mass storage memory 916, loaded into system memory 914, and executed by a processor 902 or can be provided from computer program products that are stored in tangible computer-readable storage mediums (e.g. RAM, hard disk, optical/magnetic media, etc.). Mass storage 916 may also include a cache memory 921 storing application data, user profile data, and timestamp data corresponding to the application data, and other data for use by the application 918.

The peripheral I/O controller 910 performs functions that enable the processor 902 to communicate with peripheral input/output (I/O) devices 922 and 924, a network interface 926, via a peripheral I/O bus 928. The I/O devices 922 and 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 922 and 924 may be used with the application 918 to provide a portal 108 and other interfaces for the systems 100, 600 as described in relation to the figures. The local network transceiver 928 may include support for Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100, 600 to communicate with another computer system having at least the elements described in relation to the systems 100, 600.

While the memory controller 912 and the I/O controller 910 are depicted in FIG. 9 as separate functional blocks within the chipset 908, the functions performed by these blocks may be integrated within a single integrated circuit or may be implemented using two or more separate integrated circuits. The system 900 may also implement the portal 108 and various system modules on remote computing devices 930 and 932. The remote computing devices 930 and 932 may communicate with the computing device 901 over a network link 934. For example, the computing device 901 may receive location data created by an application executing on a remote computing device 930, 932. In some embodiments, the application 918 including the portal 108 may be retrieved by the computing device 901 from a cloud computing server 936 via the Internet 938. When using the cloud computing server 936, the retrieved application 918 may be programmatically linked with the computing device 901. The application 918 may be a Java® applet executing within a Java® Virtual Machine (JVM) environment resident in the computing device 901 or the remote computing devices 930, 932. The application 918 may also be a web-based application (e.g., the portal interface 108 of FIG. 1) adapted to execute in a web-browser located on the computing devices 901, 930, and 932. In some embodiments, the application 918 may communicate with back end components 940 via the Internet 938 or other type of network.

Using the systems 100 and 600 and methods 200, 700, and 750 described herein, a self-service portal 108 and various interfaces 300, 400, 500, and 800 coupled with the methods 200, 700, and 750 may allow rapid provisioning, installation, and/or removal of virtual resources on internal hosted infrastructure. The portal 108 and system 100, 600 described herein may eliminated the need for manually-integrated tools for provisioning that are error prone and time consuming. The embodiments described herein may provide a tool that integrates various products together to provide a seamless experience for end users. Because the portal 108 may be implemented as a web-based application, underlying products and applications may be allowed to change without affecting end node users. Using the portal 108, virtual server resources may be provisioned in minutes instead of hours or days. Further, the provision process occurs almost entirely automatically, thus eliminating the need for human resources and interaction in the provisioning process and provides a single unified experience for new code and application provisioning.

The following additional considerations apply to the foregoing discussion. Throughout this specification, plural instances may implement functions, modules, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 938, may include but is not limited to any combination of a LAN, a MAN, a WAN, a mobile, a wired or wireless network, a private network, or a virtual private network. Moreover, while only one portal 108 is illustrated in FIG. 1 to simplify and clarify the description, it is understood that any number of instances of the portal 108 are supported and can be in communication with the systems 100 and 600. .

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "method" or a "function" or an "algorithm" or a "routine" is a self-consistent sequence of operations or similar processing leading to a desired result. In this context, methods, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present)

and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100, 600 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for a self service portal and automation for internally hosted virtual server resources and for provisioning cloud resources among various cloud computing system assets through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A computer-implemented method for provisioning computer code in a cloud computing system, the method comprising:
    automatically building, by a first computer device in response to a second computer device uploading a computer code file to a server, a metabase of metadata, wherein the metadata is based upon the computer code file and the metadata describes one or more dependencies of the computer code file including one or more of a data dependency, a flow dependency, an output dependency, or a control dependency;
    receiving one or more provisioning conditions at the server;
    sending, in response to the second computer device executing computer executable instructions to initiate provisioning of the computer code file, the computer code file to a plurality of cloud computing system nodes associated with a cloud computing system based upon the provisioning conditions and the metabase metadata; and
    updating, in response to the second computer device executing the computer executable instructions to initiate provisioning of the computer code file, a system administration database using the received one or more provisioning conditions and the metabase metadata, wherein the system administration database is coupled to a system administration server configured to provide information about the computer code file to the cloud computing system and to automate repetitive network administrative tasks.

2. The computer-implemented method of claim 1, wherein the computer code file includes at least one file corresponding to an application for execution on a plurality of cloud computing system nodes.

3. The computer-implemented method of claim 1, wherein automatically building the metabase of metadata includes automatically building the metabase of metadata from a plurality of sources during a provisioning process.

4. The computer-implemented method of claim 3, further comprising registering a friendly name and an internet protocol address of the computer code file with a domain name service for the cloud computing system.

5. A computer-implemented method for provisioning computer code in a cloud computing system, the method comprising:
    automatically building, by a first computer device in response to a second computer device uploading a computer code file to a server, a metabase of metadata, wherein the metadata is based upon the computer code file and the metadata describes one or more dependencies of the computer code file including one or more of a data dependency, a flow dependency, an output dependency, or a control dependency;
    sending, in response to the second computer device executing computer executable instructions to initiate provisioning of the computer code file, the computer code file to a plurality of cloud computing system nodes that are associated with a cloud computing system based upon provisioning conditions and the metabase metadata; and
    updating, in response to the second computer device executing the computer executable instructions to initiate provisioning of the computer code file, a system administration database using the provisioning conditions and the metabase metadata, wherein the system administration database is coupled to a system administration server configured to provide information about the computer code file to the cloud computing system and to automate repetitive network administrative tasks.

6. The computer-implemented method of claim 5, wherein the computer code file includes at least one file corresponding to an application for execution on a plurality of cloud computing system nodes.

7. The computer-implemented method of claim 5, wherein automatically building the metabase of metadata includes automatically building the metabase of metadata from a plurality of sources during a provisioning process.

8. The computer-implemented method of claim 7, further comprising registering a friendly name and an internet protocol address of the computer code file with a domain name service for the cloud computing system.

9. A computer device for provisioning computer code in a cloud computing system, the computer device comprising:
    one or more processors; and
    one or more memories coupled to the one or more processors;
    wherein the one or more memories include computer executable instructions stored therein that, when executed by the one or more processors, cause the one or more processors to:
        automatically build a metabase of metadata in response to a second computer device uploading a computer code file to a server, wherein the metadata is based upon the computer code file and the metadata describes one or more dependencies of the computer code file including one or more of a data dependency, a flow dependency, an output dependency, or a control dependency;
        send, in response to the second computer device executing second computer executable instructions to initiate provisioning of the computer code file, the computer code file to a plurality of cloud computing system nodes that are associated with a cloud computing system based upon provisioning conditions and the metabase metadata; and update, in response to the second computer device executing the second computer executable instructions to initiate provisioning of the computer code file, a system administration database using the provisioning conditions and the metabase metadata, wherein the system administration database is coupled to a system administration server configured to provide information about the computer code file to the cloud computing system and to automate repetitive network administrative tasks.

10. The computer device of claim 9, wherein the computer code file includes at least one file corresponding to an application for execution on a plurality of cloud computing system nodes.

11. The computer device of claim 9, wherein the computer executable instructions that, when executed by the one or more processors, cause the one or more processors to automatically build the metabase of metadata include computer executable instructions that, when executed by the one or more processors, cause the one or more processors to automatically build the metabase of metadata from a plurality of sources during a provisioning process.

12. The computer device of claim 11, wherein the one or more memories further include computer executable instructions stored therein that, when executed by the one or more processors, cause the one or more processors to register a friendly name and an internet protocol address of the computer code file with a domain name service for the cloud computing system.

13. A non-transitory computer-readable storage medium including computer readable instructions stored thereon for provisioning computer code in a cloud computing system, the instructions comprising instructions for:

automatically building, by a first computer device in response to a second computer device uploading a computer code file to a server, a metabase of metadata, wherein the metadata is based upon the computer code file and the metadata describes one or more dependencies of the computer code file including one or more of a data dependency, a flow dependency, an output dependency, or a control dependency;

sending, in response to the second computer device executing second computer readable instructions to initiate provisioning of the computer code file, the computer code file to a plurality of cloud computing system nodes that are associated with a cloud computing system based upon provisioning conditions and the metabase metadata; and updating, in response to the second computer device executing the second computer readable instructions to initiate provisioning of the computer code file, a system administration database using the provisioning conditions and the metabase metadata, wherein the system administration database is coupled to a system administration server configured to provide information about the computer code file to the cloud computing system and to automate repetitive network administrative tasks.

14. The non-transitory computer-readable storage medium of claim 13, wherein the computer code file includes at least one file corresponding to an application for execution on the plurality of cloud computing system nodes.

15. The non-transitory computer-readable storage medium of claim 13, wherein the instruction for automatically building the metabase of metadata include one or more instructions for automatically building the metabase of metadata from a plurality of sources during a provisioning process.

16. The non-transitory computer-readable storage medium of claim 15, further comprising one or more instructions for registering a friendly name and an internet protocol address of the computer code file with a domain name service for the cloud computing system.

* * * * *